Nov. 5, 1963
J. L. STREVER
3,109,434
STRAW RACK AND GRAIN PAN ARRANGEMENT
Filed Oct. 27, 1961
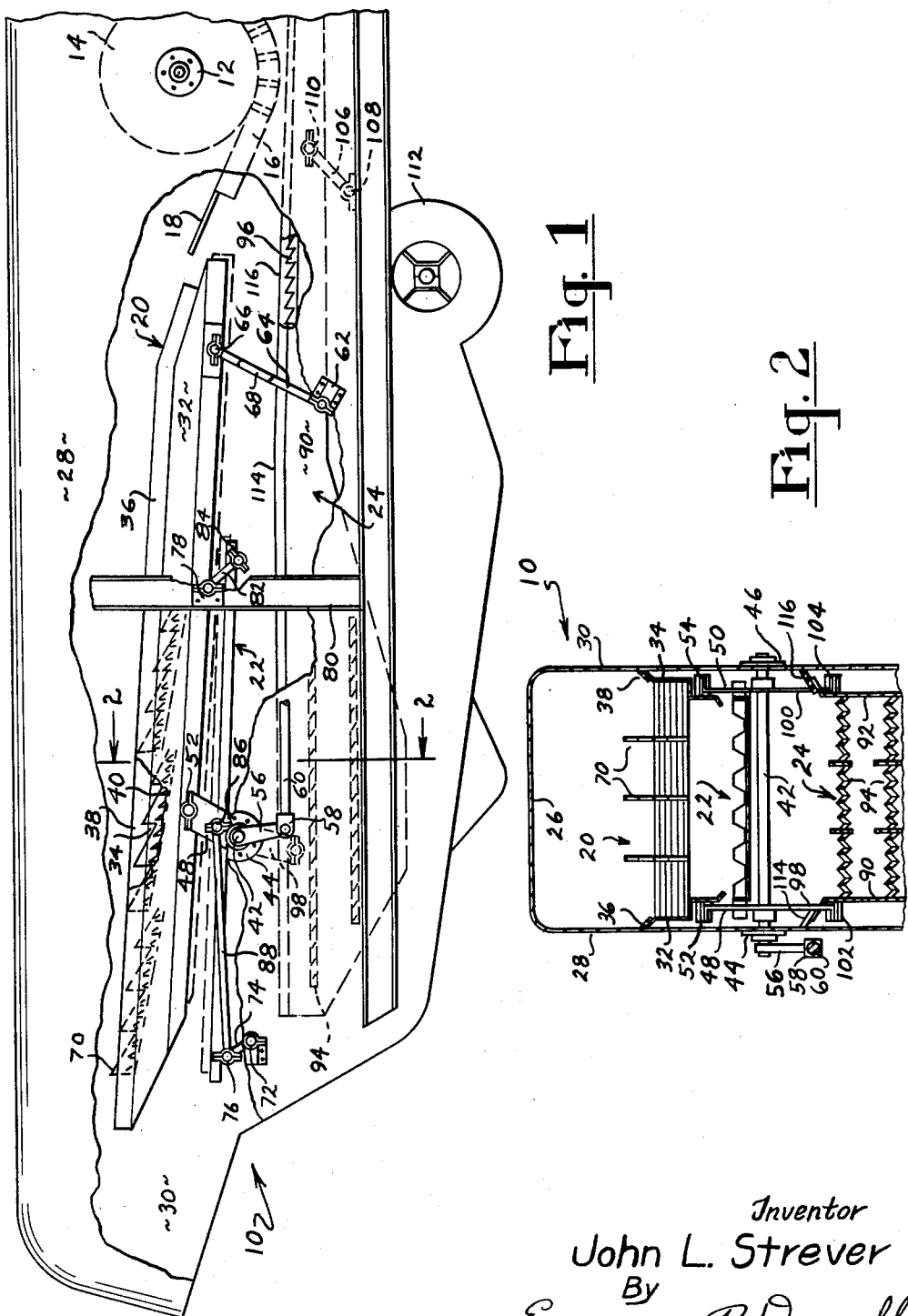
Inventor
John L. Strever
By
Emerson B. Donnell
Attorney United States Patent Office 3,109,434
Patented Nov. 5, 1963

3,109,434
STRAW RACK AND GRAIN PAN ARRANGEMENT
John L. Strever, Bettendorf, Iowa, assignor to J. I. Case Company, Racine, Wis., a corporation of Wisconsin
Filed Oct. 27, 1961, Ser. No. 148,140
2 Claims. (Cl. 130—24)

The present application relates to agricultural implements and particularly to mechanism for separating grain from straw and is used in the type of mechanism generally known as a threshing machine or combine, and an object of the invention is to generally improve the construction and operation of devices of this class.

As is well known, in devices of this type the grain as cut from the field is passed between the teeth or rub bars of a rapidly rotating cylinder and those of a concave or stationary element which is closely approached by the moving elements. In this process, the kernels of grain are separated from the straw and heads, much of the grain falling through the concave at once and being conveyed by suitable mechanism to a cleaning unit. There is, however, a very substantial volume of partially shredded straw, unthreshed grain heads, chaff, and other debris, in which is entrained a percentage of grain kernels which it is essential to recover. To recover this last percentage of grain, the aforesaid large mass of straw and the like is supported on a rack-like assembly, commonly called a strawrack, and agitated and tossed as violently as practical, while being shifted in a direction away from the cylinder until finally discharged at the rear of the machine over the end of the rack. The grain freed by the loosening of the mat of straw falls through the strawrack and is recovered for further processing.

The final treatment of the grain is performed in a cleaning shoe in which the chaff and trash remaining after treatment by the rack is blown away, and while this system has been generally satisfactory, it leaves something to be desired. In other words, there is room for improvement, and a further object of the invention is to improve the separation of the grain from the straw and trash between the cylinder and the cleaning shoe.

A further object is to provide a supply of air to assist in the separation which is in a sense separate from that supplied by the usual fan. A further object is to supply this air on an intermittent basis, or in a series of puffs which will tend to lift the mass of straw and loosen it to free the grain kernels.

The material falling through the usual strawrack is commonly gathered in a strawrack return or grain pan beneath the rack and directed by the pan to the cleaning shoe, and a further object is to utilize such a grain pan to generate the intermittent or puffing air supply.

A further object is to provide support or suspension means for the strawrack and the return pan, so constituted as to cause a rapid or abrupt approach of these elements to each other during their reciprocatory movements, such that the imperforate pan will displace a substantial amount of air upwardly through the strawrack.

Further objects and advantages will become apparent from the following specification, and the accompanying drawings in which an illustrative embodiment of the invention is shown, but it is to be understood that nothing in this specification or drawings is to be taken as limiting the invention in any manner except as defined by the claims.

FIGURE 1 is a side elevation of so much of a threshing mechanism of the type contemplated as is necessary for an understanding of the invention, parts being removed and others broken away to show what lies within.

FIG. 2 is a partial cross section of the mechanism shown in FIG. 1 on the line 2—2 of FIG. 1.

As seen in the drawings, the machine incorporating the invention includes a housing, generally designated as 10, in which is journaled in suitable bearings as 12, a cylinder of any suitable or well-known type 14, and which is rotated in any suitable or well-known manner not necessary to show and describe since it forms no part of the present invention. A concave 16 is suitably supported in close proximity to cylinder 14 and has a plurality of bars or fingers constituting a grate 18 directed to a region above a strawrack, generally designated as 20.

Material falling through strawrack 20, as heretofore suggested, is gathered on a strawrack return pan, generally designated as 22, and delivered to a combination grain pan and cleaning shoe, generally designated as 24, the several elements, strawrack 20, return pan 22, and cleaning shoe 24 being moved in a manner to agitate and toss the material lying thereon in a manner to be fully described hereinafter.

Returning to a more detailed description of the several elements of the machine, housing 10 includes a top portion 26 and sidewalls 28 and 30, bearing 12 being suitably and strongly supported in sidewall 28, and as will be understood, a similar bearing being supported in sidewall 30, but not shown, as it forms no part of the present invention.

Strawrack 20 includes a side portion 32 and a side portion 34 which form the sides of the generally rectangular strawrack and which are elongated and fitted at their upper edges with strips of flexible material, such as, for example, belting 36 and 38 which brushes lightly respectively against sidewalls 28 and 30 to form a seal between the reciprocating strawrack and the relatively stationary housing. In this manner, grain is prevented from escaping between the housing and the strawrack and forced to fall through the rack to be later processed by other components of the machine. Furthermore, these sealing strips 36 and 38 close the junction between the moving strawrack and the stationary housing in a manner which is to all practical intents and purposes airtight.

Strawrack 20 may be made in any well-known manner and is shown as having a multiplicity of cross bars 40, spaced to provide a great number of openings for the passage of grain while supporting the great bulk of straw above the rack. Cross bars 40 are preferably shaped to present an upwardly and rearwardly inclined face toward the front of the combine, and a substantially vertical face toward the rear so that the longitudinal or reciprocating motion of the strawrack will tend to work the crop material backwardly and off of the rear end of the rack.

Side member 32 is supported in a manner which will now be described, it being understood that side rail 34 is similarly supported on the far side of the machine, as related to FIG. 1. A shaft 42 is journaled in suitable bearings 44 and 46 carried on sidewalls 28 and 30 respectively and has upstanding arms or supporting links 48 and 50 fixed thereon and extending generally forwardly and upwardly within sidewalls 28 and 30. At their upper ends, arms 48 and 50 are pivotally secured by suitable bearings or pivotal connections 52 and 54 to side portions 32 and 34 respectively. Assuming proper support of strawrack 20 at its front end, rocking of shaft 42 will cause generally longitudinal to-and-fro movement or reciprocation of rack 20. Such rocking is accomplished by an arm 56 fixed to shaft 42 outside of sidewall 28 and having a pivotal connection 58 with a pitman 60 which is reciprocated in any suitable or convenient manner not necessary to show or describe, from any suitable power-operated mechanism in the machine.

Spaced forwardly from shaft 42 is a bearing 62 supported on sidewall 28 and pivotally carrying a supporting link or member 64. Link 64 extends generally upwardly and forwardly, in the present instance outwardly of sidewall 28 and, through a pivotal connection 66 is connected with side portion 32 of strawrack 20, pivotal connection 66 playing back and forth through a suitable slotted opening. A similar link 68 is similarly supported on the opposite side of the strawrack and supports side member 34. It will be observed that as a result of the positioning of arms 48 and 50 together with links 64 and 68, that forward reciprocation of strawrack 20 from the position shown, will result in an appreciable downward movement or bodily downward movement of the strawrack together with the aforesaid forward movement, and this downward movement is utilized for a purpose to appear.

Strawrack 20, in addition to bars 40, includes a plurality of separators or "fishbacks" 70, of well-known form which tend to guide the bulk of the straw and keep it from sliding to the low side of the rack when operating on ground that is not entirely level. They also serve to assist in propelling the straw toward the end of the rack.

As stated, the material falling through strawrack 20 is gathered in part on combination cleaning shoe and grain pan 24, while the rest is gathered in grain pan or strawrack return 22 which is closely spaced under the major portion of strawrack 20 toward the rear.

Grain pan 22 comprises a pan-like element longitudinally corrugated, as best seen in FIG. 2 so that the relatively fine material will be prevented from sliding to the low side during operation on other than level ground.

At the rear of grain pan 22, a bearing 72 supported on side wall 28 pivotally carries a supporting member or link 74 which extends upwardly and rearwardly, inwardly of wall 28 and supports the rear end of grain pan 22 through a pivotal connection 76. At the front of grain pan 22 a bearing 78 supported on a frame element 80 pivotally supports a link or supporting member 82 which extends downwardly and sharply forwardly from bearing 78 inwardly of wall 28 and has a pivotal connection 84 with the front portion of grain pan 22. As will be apparent, forward motion of grain pan 22 from the position shown will cause some upward movement of the rear end of pan 22 along with substantial upward movement of the front end of pan 22.

Reciprocating motion is imparted to grain pan 22 from above-mentioned arm 48, the latter having a pivotal connection 86 to a pitman or tie rod 88 which extends backwardly and is pivotally connected to above-mentioned pivotal connection 76. In this manner, strawrack 20 and grain pan 22 are synchronized in their movement to the extent that both go forward together and also backward together. However, it will be noted that while both strawrack 20 and grain pan 22 are moving forwardly, strawrack 20 is moving downwardly while grain pan 22, especially at its front end is moving sharply upwardly and the parts are so constituted that upon maximum forward movement they approach each other to the extent indicated by the dotted lines in FIG. 1.

Links 74 and 82 are duplicated on the opposite side of the machine, but are not shown to avoid complication, and it is contemplated that pitman 88 may preferably be duplicated on the opposite side of the machine in order to balance the stresses in the structure.

It will be appreciated that grain pan 22 is a part presenting a rather large area of imperforate surface and that any component of movement of a sheet having such an area transverse to such area will move a quite substantial volume of air and impart thereto a substantial amount of kinetic energy. Furthermore, while grain pan 21 does not fit the housing in an airtight manner, the area of the space between grain pan 22 and sidewalls 28 and 30 respectively is very small in comparison to the area of the entire grain pan. Furthermore, while the strawrack, in one sense is nothing much but a mass of holes, when it is loaded with straw and chaff, it becomes a floor or platform which is nearly enough imperforate to at least partially confine the air disturbed and given an upward velocity by grain pan 22. It follows that the upward puff of air generated by the motion of the grain pan acts directly on the under side of the material carried on the strawrack and tends to lift it clear of the rack and to assist the motion of the rack in agitating the material and loosening it to allow the captive grain to fall through the rack.

This action of the air is assisted by the fact that at that moment the strawrack is moving downwardly as well as forwardly. It is to be noted that the mat of material has considerable inertia and that the quick downward movement of the strawrack, if it does not actually cause the strawrack to momentarily leave the straw, at least tends to do this, and in any event reduces the proportion of the weight of the straw momentarily being carried by the rack. Under these conditions, the puff of air generated by the grain return pan is assisted in its work of lifting and loosening the straw.

Combination cleaning shoe and grain pan 24 may be of any suitable construction, in the present instance having side members 90 and 92 between which are supported a plurality of sieves 94 which may be of any suitable construction and are not further disclosed since they form no part of the present invention. Side members 90 and 92 extend forwardly in the machine to a position under concave 16 and are connected by a deck or sheet 96 of well-known corrugated form, such that reciprocating movement of the shoe and grain pan will cause material thereon to progress toward the rear of the machine and finally onto sieves 94.

Side members 90 and 92 are supported by depending arms 98 and 100 constituting a part of above-mentioned arms 48 and 50 respectively and connected by pivotal connections 102 and 104 with side members 90 and 92. At their front ends, members 90 and 92, substantially beneath concave 16 are supported on forwardly and upwardly directed links as 106, pivotally connected at 108 with housing 10 and at 110 with member 90. It will be understood that a similar link supports member 92 on the other side. Rocking of shaft 42 therefore causes reciprocating movement of combination shoe and grain pan 24 in synchronism with strawrack 20 and grain pan 22, but in opposite phase. In other words, while strawrack 20 goes forward, shoe 24 goves backward. In this way, the two substantially counterbalance each other and avoid violent vibration of the machine as a whole.

A fan 112 of conventional character furnishes a wind blast for shoe 24 in well-known manner, and it is to be understood that a great number of parts, such as shafts, belts, pulleys, cranks, and the like are present in the actual machine but have been omitted from the drawings in order to avoid confusion, since they are well known and form no part of the present invention.

Combination grain pan and shoe 24 is provided with strips of flexible material 114 and 116 which brush against walls 28 and 30 respectively to seal the spaces between the housing and shoe 24 against the escape of grain.

The operation of the invention is thought to be clear from the above, but to summarize, the heads of grain and straw are, to a large extent, disintegrated between cylinder 14 and concave 16, the greater part of the grain falling to combination grain pan and cleaning shoe 24, where it is worked backwardly over deck 96 until it reaches sieves 94 where the chaff and lighter materials are blown away by the blast from fan 112. The mangled straw and other more bulky material is thrown onto strawrack 20 and jostled and agitated and worked backwardly so that any grain entrained therein may be loosened and fall through the spaces between bars 40 onto grain pan 22. The motion of grain pan 22 works this material forwardly until it falls out of the front end onto shoe 24 to be treated like the material coming directly from concave 16. However, by virtue of the peculiar relation between strawrack 20 and grain pan 22 and particularly by reason of the peculiar relations or novel relations of arms 48 and supporting links 64, 74, and 82 respectively, and their companions, a substantial upward puff of air is caused to pass through strawrack 20 upon each forward reciprocation thereof, this puff being caused by the action of grain pan 22 in addition to its ordinary function of gathering and transporting the material falling through strawback 20. It will therefore be apparent that a device has been constructed which will accomplish the objects of the invention as hereinbefore set forth, and what is claimed as new and desired to be secured by Letters Patent of the United States is:

1. In a grain and straw separating mechanism of the type including a threshing cylinder, a concave cooperating therewith and a cleaning shoe, the improvement comprising a separator
   housing, a
   strawrack arranged longitudinally within the housing, an imperforate
   grain pan arranged longitudinally within the housing beneath the strawrack,
   means connected with the strawrack and with the grain pan arranged to reciprocate the strawrack and the grain pan in generally the same direction in synchronism, supporting
   links pivoted to the separator housing below the strawrack, extending
   upwardly and pivoted at their upper ends to the strawrack, the reciprocating means being positioned to move the strawrack from a position wherein the links are approximately
   vertical to a position wherein the links are in an
   upwardly and forwardly inclined position, so that the strawrack will be lowered upon forward movement thereof, supporting
   links for the grain pan pivoted to the separator housing
   below the grain pan, extending
   upwardly and pivoted at their upper ends to the
   rear portion of the grain pan in such a position as to extend in an
   upward and rearward direction when the first-mentioned links are approximately vertical, and movable by reason of the aforesaid reciprocation of the grain pan from said rearwardly inclined position to a substantially
   vertical position, and other
   links pivoted to the separator housing
   above the grain pan, extending
   downwardly and pivoted at their
   lower ends to the
   forward portion of the grain pan and movable by reason of reciprocation of the grain pan from an approximately
   vertical depending position to a downwardly and sharply
   forwardly inclined position, whereby to abruptly
   raise the front of the grain pan upon
   forward reciprocation thereof, and the strawrack and the grain pan having a
   close fit with the sides of the separator housing whereby the abrupt
   approach of the imperforate grain pan and the strawrack will generate a
   surge or puff of air upwardly through the strawrack each time the strawrack and grain pan are forwardly reciprocated.

2. In a grain and straw separating mechanism of the type including a threshing cylinder, a concave cooperating therewith and a cleaning shoe, the improvement comprising a separator
   housing, a
   strawrack arranged longitudinally within the housing, an imperforate
   grain pan arranged longitudinally within the housing beneath the strawrack,
   means connected with the strawrack and with the housing, supporting and guiding the strawrack for reciprocation in a forwardly and downwardly inclined path,
   supporting means connected with the grain pan and with the housing, supporting and guiding the rear end of the grain pan for reciprocation in a forwardly and upwardly inclined path,
   supporting means connected with the grain pan and with the housing and supporting the front end of the grain pan for reciprocation in a forwardly and substantially more sharply upwardly inclined path than the path of said rear end, so that reciprocation of said grain pan will abruptly
   raise the front of the grain pan upon
   forward movement thereof, and the strawrack and the grain pan having a
   close fit with the sides of the separator housing whereby the abrupt
   approach of the imperforate grain pan and the strawrack will generate a
   surge or puff of air upwardly through the strawrack each time the strawrack and grain pan are forwardly reciprocated.

References Cited in the file of this patent

UNITED STATES PATENTS

| | | |
|---|---|---|
| 488,067 | Foster | Dec. 13, 1892 |
| 2,351,567 | Welty | June 13, 1944 |
| 2,903,135 | Dryg | Sept. 8, 1959 |